| United States Patent [19] | [11] Patent Number: 4,937,297 |
| --- | --- |
| Dean | [45] Date of Patent: Jun. 26, 1990 |

[54] POLYARYLATE-POLYAMIDE BLOCK COPOLYMERS

[75] Inventor: Barry D. Dean, Belle Mead, N.J.

[73] Assignee: Amoco Corporation, Chicago, Ill.

[21] Appl. No.: 189,226

[22] Filed: May 2, 1988

[51] Int. Cl.$^5$ .................... C08L 67/00; C08L 77/00
[52] U.S. Cl. .................... 525/425; 525/421; 525/426; 525/433
[58] Field of Search ............ 525/421, 425, 433, 426

[56] References Cited

U.S. PATENT DOCUMENTS 4,788,248  11/1988  Maresca et al. .................... 525/425

FOREIGN PATENT DOCUMENTS 1141118  1/1969  United Kingdom ................ 525/425

*Primary Examiner*—Ana L. Carrillo
*Attorney, Agent, or Firm*—Janice M. McLain; Ralph C. Medhurst; William H. Magidson

[57] ABSTRACT

Novel, well-defined thermoplastic block copolymers containing polyarylate and polyamide blocks. Preferably formed via a cycloaddition reaction of a polyamide having at least one terminal double bond, with a polyarylate having at least one dihydroarylcyclobutenyl moiety. They display excellent mechanical properties, improved UV, solvent and stress-crack resistance; good heat resistance and are easy to melt fabricate. They show good compatability with the corresponding homopolymers and are uniquely suited as compatibilizing agents for polyamide-polyarylate blends.

16 Claims, No Drawings

POLYARYLATE-POLYAMIDE BLOCK COPOLYMERS

FIELD OF THE INVENTION

The present invention describes novel, well-defined thermoplastic block copolymers containing polyarylate and polyamide blocks. The compositions are preferably formed via a cyclo-addition reaction of a polyamide having at least one terminal ethylenically unsaturated double bond, with an aromatic polyester having at least one dihydroarylcyclobutenyl moiety.

The novel block copolymers display excellent mechanical properties, improved UV, solvent and stress-crack resistance; they possess good heat resistance and are easy to melt-fabricate. They show good compatibility with the corresponding homopolymers, and are uniquely suited as compatibilizing agents for polyamide-polyarylate blends.

BACKGROUND OF THE INVENTION

Polyarylates are aromatic polyesters derived from dihydric phenols and aromatic dicarboxylic acids. The material based on 2,2-bis(4-hydroxyphenyl)propane (bisphenol-A) and a 50:50 mixture of terephthalic and isophthalic acids (1) is offered commercially by Amoco Performance Products, Inc. under the tradename of ARDEL D-100®.

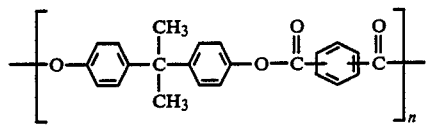 (1)

Polyarylates are high temperature, high performance thermoplastic polymers with a good combination of thermal and mechanical properties. They display excellent UV resistance and have good processability which allows them to be molded into a variety of articles.

A drawback of polyarylates is their lack of good solvent, chemical and environmental stress-crack resistance.

Aliphatic and aliphatic-aromatic polyamides, depending on their composition, are either crystalline or amorphous. The crystalline versions display high melting points and provide a class of polymers with good high temperature properties. The amorphous aliphatic-aromatic polyamides show high glass transition temperatures. Both have good mechanical properties, solvent, chemical and stress-crack resistance. Polyamides have been described-see, for example, J. Zimmerman, Encyclopedia of Polymer Science and Engineering, 2nd. Edition, Vol. 11, pp. 315-381, John Wiley and Sons, Inc., New York, N.Y., 1988.

It has now been unexpectedly discovered that a block polymer of polyarylates-polyamides can be produced and that it has superior U.V. resistance, good processability and good solvent, chemical, and stress crack resistance. Furthermore, a new method to prepare these copolymers, having a well-defined structure, has been developed. It is found that polyarylates having at least one terminal dihydroarylcyclobutene group per chain, react with polyamides having at least one terminal ethylenically unsaturated double bond per molecule, to give the present polyarylate-polyamide block copolymers.

Block copolymers containing polyamide and polyester segments have been described. U.S. Pat. No. 4,258,154 discloses a resin composition consisting essentially of (A) an aromatic polyester-polycarboxylic anhydride and (B) a polyamide. The reference implies that a reaction of the terminal amino group of the polyamide with the anhydride group of the polyester takes place upon blending; a chemical bond between the two polymers is created. Allegedly, a blend with improved mechanical properties is obtained. U.S. Pat. No. 4,417,031 discloses a process for preparing block and/or graft copolymeric compositions by forming an intimate mixture of two or more polymers, at least one of which includes one or more amino junctions, and at least one of the remaining polymers includes one or more carboxylic acid junctions and an effective amount of a phosphite compound. The mixture is then heated at a temperature and for a time sufficient to form the desired block, and/or graft copolymers. Clearly, both of the cited patents yield ill-defined mixtures.

Polymers based on dihydroarylcyclobutenes are known in the literature. U.S. Pat. No. 4,540,763 describes the formation of thermosets by thermally reacting poly(dihydroarylcyclobutenes). Thermosetting materials may be formed via a similar reaction from bifunctional dihydrobenzocyclobutene-alkyne imide monomers, as described in U.S. Pat. No. 4,675,370 and in the Journal of Polymer Sci., Polymer Chemistry 25, p. 3159 (1987); a related reaction, the formation of thermosetting polymers by heat-treating alkynyl-bridged poly(-dihydroarylcyclobutenes), is disclosed in U.S. Pat. No. 4,687,823. The formation of crosslinked products is also the subject of U.S. Pat. Nos. 4,687,815 and 4,708,994 and of European Patent Application No. 227,124. Dihydrobenzocyclobutene end-capped styrene, diene, or styrene-diene copolymers were shown to be capable of thermally induced coupling-see U.S. Pat. No. 4,708,990. Difunctional dihydroarylcyclobutenes, such as the 4,4'-ethylidene dibenzocyclobutene, were used as crosslinking agents for ethylene-propylene-diene rubbers, as described in European Patent Application No. 227,163. Adhesives capable of bonding steel substrates have formed via the thermal polymerization in situ of arylcyclobutenes, such as N-7(benzocyclobutene-4-carboxamido)heptylbenzocyclobutene-4-carboxamide, and are disclosed in PCT Int. Appl. No. WO 87/01,383. U.S. Pat. No. 4,719,283 claims thermoplastic polyimides made by the reaction of bis-maleimides with substituted derivatives of (2) below.

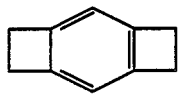 (2)

DESCRIPTION OF THE INVENTION

It has been unexpectedly discovered that thermoplastic block polymers, as depicted in (3), having superior properties can be produced from the reaction of polyarylates having at least one dihydroarylcyclobutene end-group per chain with polyamides having at least one ethylenically unsaturated double bond per molecule, $$(B)_{U-1}(AB)_n(A)_{V-1}$$ (3)

A is a polyarylate block, B is a polyamide block, n is one or greater, and U and V are independently 1 or 2; however, mixtures of the various blocks may be present.

The weight percent of polyarylate in these novel materials may be in the range of from about 1 to about 99 percent; products containing from about 30 to about 70 weight percent of polyarylate are preferred and most preferred are products containing from 40 to 60 percent polyarylate. The block copolymers of the present invention display excellent mechanical properties, improved UV, solvent and stress-crack resistance, good heat resistance, and easy melt fabricability. In addition, they are quite unexpectedly compatible with the corresponding homopolymers, and are uniquely suited as compatibilizing agents for polyamide-polyarylate blends.

The block-forming reaction is illustrated in equation (I) wherein the dihydroarylcyclobutene is a dihydrobenzocyclobutene, and wherein the polyamide is terminated by a maleimido end-group.

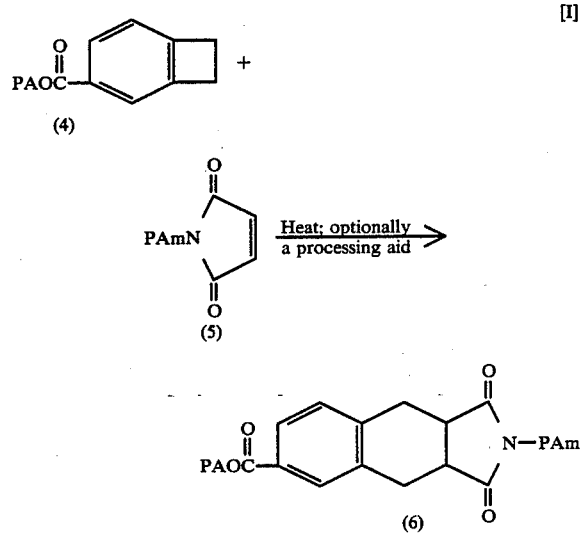

The Applicant speculates that under the reaction conditions, the dihydrocyclobutene ring of (4) opens to give a highly reactive diene (7) (equation (II)). The latter then reacts with the double bonds of (5) via a Diels-Alder reaction and yields the block copolymer (6). This is Applicant's theory only and is not intended to be a limitation on the composition or reaction mechanism.

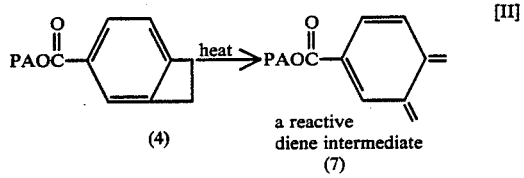

In the equations [I] and [II] PA stands for the polyarylate. It is attached to the dihydrobenzocyclobutene moiety via an ester linkage. Other linking groups are also feasible and are discussed below. PAm stands for polyamide; it has a terminal maleimide function; other unsaturated end-groups are also possible.

The block structure (6) can be molded neat into a tough, high heat thermoplastic; or it may be physically added to the polyarylate, or to the polyamide, or to mixtures of both to give compositions with attractive characteristics. It is also possible to prepare the block copolymer in the presence of one or both of the corresponding non-terminated homopolymers and, thus, obtain the blend composition in one step.

The polyarylates useful in the instant invention are based on (a) at least one dihydric phenol of the formula

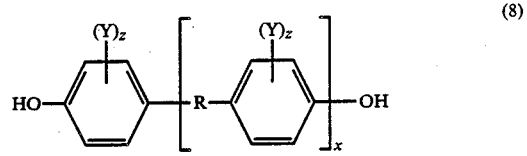

where Y is independently selected from alkyl groups of 1 to 4 carbon atoms, chlorine or bromine; Z independently has a value of from 0 to 4, inclusive, and R is independently selected from a divalent $C_6$ to $C_{20}$ aromatic or $C_1$ to $C_9$ saturated aliphatic hydrocarbon radical, particularly alkylene or alkylidene radicals having from 1 to 8 carbon atoms, especially $C(CH_3)_2$, cycloalkylene, or cycloalkylidene radicals having up to and including 9 carbon atoms, O, S, SO, $SO_2$, CO and a chemical bond, x is 0 or 1; and (b) at least one aromatic dicarboxylic acid. The dihydric phenols that may be used in this invention include the following:

2,2-bis(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis(4-hydroxyphenyl)ethane,
1,2-bis(4-hydroxyphenyl)ethane,
1,1-bis-(4-hydroxy-2-chlorophenyl)ethane,
1,1-bis-(3-methyl-4-hydroxyphenyl)ethane,
1,1-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-dihydroxydiphenylether,
4,4'-dihydroxydiphenylsulfide,
2,2-bis-(4-hydroxy-3,5-dichlorophenyl)propane,
4,4'-dihydroxydiphenylsulfone,
4,4'-dihydroxydiphenyl sulfoxide,
4,4'-dihydroxybenzophenone, and 4,4'-biphenol.

In addition, diphenols such as hydroquinone and the naphthalene diols are also useful.

These dihydric phenols may be used individually or in any combination which when reacted with an aromatic dicarboxylic acid or mixtures thereof produces polyarylate polymers and copolymers that are soluble in inert organic solvents as hereinbelow defined. The preferred dihydric phenol is 2,2-bis(4-hydroxyphenyl)propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl groups contain from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the instant invention are preferably produced at low temperature such as by the acid chloride process. In one low temperature technique, polycondensation of the aromatic acid chloride with the dihydric phenol is effected at ambient temperatures in an inert solvent, such as methylene chloride, in the presence of a basic catalyst and an acid acceptor. This type of process is described in, for example, U.S. Pat. No. 3,234,168. The condensation may also be performed in the presence of an inorganic acid acceptor, such as $Ca(OH)_2$ suspended in an inert organic solvent, as described in U.S. Pat. No. 3,939,117. A second, immiscible solvent, e.g., water, may be present in these low-temperature reactions. This process variant is referred to as the interfacial or phase boundary polymerization. In the interfacial reaction the phenolic components are dissolved in an aqueous alkaline phase. Small quantities, e.g., 0.01 to 1.0 percent by weight (based on the phenolic materials used) of reducing alkaline substances, such as sodium bisulfite for example, may be added to the aqueous phase. Quaternary ammonium or phosphonium compounds, in amounts ranging from about 0.01 to about 5.0 mole percent based on the phenolic components, may be used as the polymerization catalysts. The acid chlorides are dissolved in the organic solvent and the solution is brought into contact with the aqueous alkaline solution which contains the phenolates. The two phases are vigorously stirred and polymer formation occurs at the interface. Preferred solvents for the low-temperature polymerization include methylene chloride, chloroform, tri- and tetrachloroethylene, tetrachloroethane, chlorobenzene, dichlorobenzene, tetrahydrofuran, and mixtures of these solvents. Temperatures are generally in the range of from about 0° to about 40° C., preferably in the range of from about 15° to about 30° C.

In order to ensure the required dihydroarylcyclobutene termination, i.e, at least one end-group per polyarylate chain, the polycondensation reaction is preferably performed in the presence of an appropriate dihydroarylcyclobutene derivative. The latter must be capable of reaction with either the hydroxyl group or the acid chloride group. The dihydroarylcyclobutene derivatives that may be used are, for example, (9), (10), or (11).

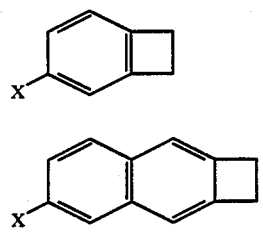

(9)

(10)

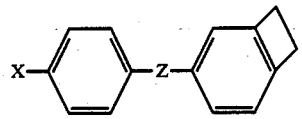

(11)

In the formulae above, Z is selected from the group of O, SO, $SO_2$, CO, S-S, S, $C_1$ to $C_9$ alkylene, $C_1$ to $C_9$ alkylidene, $C_5$ to $C_9$ cycloalkylidene, $C_5$ to $C_9$ cycloalkylene, or a chemical bond; X is HO, HS, $NH_2$, COCl, OCOCl, or NCO.

Methods whereby these cyclobutene derivatives can be prepared are discussed in the sections that follow.

It is also possible to prepare the polyarylate first and then end-cap it with the arylcyclobutene moiety.

The variant whereby the polyarylate is prepared first and then reacted with an appropriately functionalized arylcyclobutene derivative, is desirable in those instances where high temperature, especially high temperature bulk processes, are used for the synthesis of the polyarylate segment. The high temperature acid chloride solution process, the diacetate process and the diphenate process, are discussed below.

The high-temperature acid chloride process involves the condensation reaction at elevated temperatures (>100° C.) in high boiling solvents The reactions may be performed in the absence of catalysts, in which case temperatures in excess of 200° C. are preferred. The polycondensations may also be catalyzed, for example with magnesium, as described in U.S. Pat. No. 3,733,306 and by Matzner and Barclay, J. Appl. Polymer Sci., Vol. 9, pp. 3321-3336 (1965). Another class of catalysts are, for example, the titanate esters described in German Patent Application No. 1,933,657. Lower temperatures are satisfactory for the catalyzed reactions and are generally in the range of about 110° C. to about 220° C., although higher temperatures may be necessary in some instances.

Inert, high boiling solvents which can be used in the high temperatures process are those that do not react with either the starting materials or the final polyester. Also, the solvents should dissolve the polyarylate formed. Representative solvents include the chlorinated aromatic hydrocarbons such as chlorobenzene, dichloro-, trichloro-, and tetrachlorobenzenes, chlorinated biphenyls or diphenyl ethers, chlorinated naphthalenes; as well as non-chlorinated aromatics such as anisole, nitrobenzene, ditolylmethane, terphenyl, benzophenone, the dibenzylbenzenes, and the like.

The diacetate process consists in the reaction of aromatic diacids with diesters of the dihydric phenols, i.e., derivatives of the formula $$R''COOAr_1OCOR'' \qquad (12)$$

where R″ is, for example, a $C_1$ to $C_{10}$ aliphatic group, and $Ar_1$ is the residuum of the dihydric phenol. Thus, the polymerizations using the diacetate process require first the preparation of a diester of the dihydric phenol with a monocarboxylic acid. In principle, any monocarboxylic acid can be used; aliphatic acids containing from two to eleven carbon atoms are preferred; most preferred are $C_2$ to $C_4$ aliphatic acids. The esters (12) are then reacted under acidolysis conditions with dicarboxylic acid or mixtures of dicarboxylic acids; the reaction yields polyarylate and monocarboxylic acid. The monocarboxylic acid can be recycled. The two steps, i.e, the preparation of the monocarboxylic acid esters (12), and their polymerization, can be performed separately, or in a one-pot procedure. It is preferred that the intermediate diesters contain ≦ than about 1,500 parts per million of residual acid anhydride prior to polymerization. This procedure, as described in U.S. Pat. No. 4,321,355, yields polyarylates having good color and melt-stability. The acidolysis reaction can be performed in bulk or in the presence of a processing aid. The preferred processing aids are a diphenyl ether compound as described in U.S. Pat. Nos. 4,294,956 and 4,296,232; a cycloaliphatic substituted aromatic or heteroaromatic compound, as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The acidolysis reactions are carried out in the temperature range of about 200° to about 350° C.; preferably in the temperature range of about 250° to about 325° C. However, lower and higher temperatures may also be used. The reactions can be carried out at atmospheric or subatmospheric pressures; they can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

In the diphenate process, a diaryl ester of an aromatic diacid, for example (13),

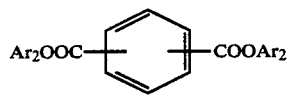

(13)

where $Ar_2$ is a monovalent aromatic radical, is reacted with the dihydric phenol. The reaction yields the polyarylate and the phenol $Ar_2OH$, which can be recycled. The group $Ar_2$ can be derived from any phenol; phenyl or tolyl groups are preferred. The polymerization is essentially an ester-interchange reaction; the two steps, i.e., the preparation of (13) and their polymerization, may be performed separately or in a one-pot procedure.

The ester-exchange reaction can be performed in bulk or in the presence of a processing aid. The preferred processing aids are a diphenyl ether compound, a cycloaliphatic substituted aromatic or heteroaromatic compound, or a halogenated and/or etherated substituted aromatic or heteroaromatic compound as described in, for example, U.S. Pat. No. 4,459,384.

It is most preferred to use the diphenyl isophthalates and terephthalates. The ester-exchange reaction is generally carried out in the temperature range of 200° to 350° C. However, lower or higher temperatures may also be used. The reaction can be performed at atmospheric, reduced, or higher than atmospheric pressures.

Catalysts, generally compounds containing metals such as the alkali and alkaline earth metals, cerium, manganese, cobalt, zinc, germanium, tin, antimony and bismuth, may be used to accelerate the polymerization. Examples of typical catalysts are the alkali metal phenoxides, hydroxides, and alkoxides.

It should be noted that the approach where the cyclobutene compound is added to the polyarylate-forming reaction mixture rather than reacted in a separate step with a preformed polyarylate is preferred. In Other words, the low temperature preparation of the polyarylate is deemed more attractive. In addition to the inherently better stability of the cyclobutene ring at these low temperatures, there are two other reasons for such preference. First of all, the end-capping of each polyarylate chain is much easier via this approach, and no excess of the cyclobutene material is required. In addition, one is able to control the molecular weight of the polyarylate by simply adjusting the amounts of the dihydroarylcyclobutene derivatives relative to the acid chloride and dihydric phenol.

In those instances where a high temperature process is used with simultaneous end-capping, it should preferably be conducted below about 200° C. However, if the polyarylate is prepared via solution or bulk reactions at temperatures in excess of 200° C., end-capping with an arylcyclobutene moiety must be performed, as indicated earlier, in a separate step. To this end the polyarylate is dissolved in a solvent, preferably an aliphatic or aromatic chlorinated solvent, or an amide solvent such as N,N-dimethylformamide, N,N-dimethylacetamide or N-methylpyrrolidone, in which it is reacted with a suitably terminated arylcyclobutene derivative. These reactions are preferably conducted at temperatures below about 200° C. so as to preserve the integrity of the cyclobutene ring.

Typical end-capping reactions include contacting an isocyanate, an acid chloride, or a chlorocarbonyloxy terminated arylcyclobutene compound with a polyarylate bearing at least one free hydroxyl end-group; contacting an amino, an isocyanato, an acid chloride, or a chlorocarbonyloxy terminated arylcyclobutene with a polyarylate having at least one carboxyl end-group; or a hydroxy, mercapto or amino terminated arylcyclobutene with a polyarylate possessing at least one acid chloride end-group.

The polyarylate fragments may bear either one or two arylcyclobutene end-groups. If one arylcyclobutene end-group is desired, the polyarylate chain that is being end-capped should carry one hydroxyl, carboxyl or acid chloride function. This, in turn, means that the polyesterification leading to the polyarylate has to be performed with stoichiometric amounts of the reactants and stopped when the desired molecular weight is reached. When it is desired to end-cap both ends of the polyarylate chains, the latter should have a dihydroxy, a dicarboxy, or a diacid chloride termination prior to reaction with (9), (10), or (11). Difunctionality is easily imparted by using a slight excess of one of the polyarylate co-reactants. It is, of course, also possible to prepare a "monofunctional" polyarylate by using stoichiometric amounts of reactants, and react it in a separate step with a slight amount of a diphenol, diacid, or diacid chloride to obtain a difunctional polymer.

As will be discussed later, similar considerations (mono- versus difunctionality) are also applicable to the polyamide segments. Mono- or difunctionality of the chains determine the structure of the block copolymers. Functionality combinations and structures are shown below:

| Functionality | | |
|---|---|---|
| Polyarylate (block A) | Polyamide (block B) | Block Structure |
| mono | mono | AB |
| di | mono | BAB |
| mono | di | ABA |
| di | di | (AB)$_n$ where n is as previously defined. |

Thus, the dihydroarylcyclobutene end-capped polyarylates are of the general formulae (14) or (15).

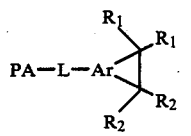  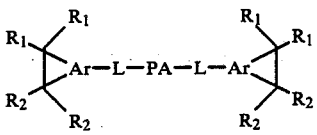

(14)  (15)

In the formulae above PA is a polyarylate as previously defined; Ar, $R_1$ and $R_2$ are as hereinbelow defined; and the linking group L is selected from

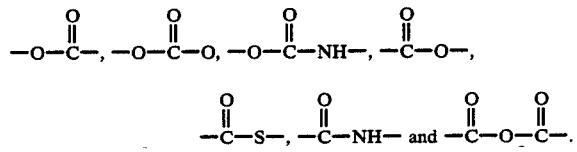

It is preferred that the reduced viscosity of the polyarylate be in the range of 0.3 to 1.10 dl/g as measured in chloroform, at 25° C., at a concentration of 0.5 g per 100 ml. However, higher and lower molecular weights are also useful.

The dihydroarylcyclobutenes are of the general formula (16)

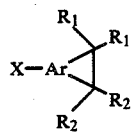

(16)

where X as previously defined and is HO, HS, NH$_2$, COCl, OCOCl or NCO; Ar is a trivalent aromatic residue, two of the valencies being in positions ortho relative to each other. The group Ar is selected from (17), (18), or (19)

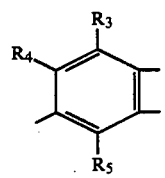

(17)

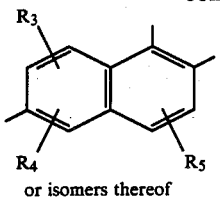

or isomers thereof (18)

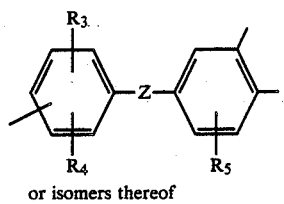

or isomers thereof (19)

Z as previously defined is selected from the group of O, SO, SO$_2$, CO, S-S, S, C$_1$ to C$_9$ alkylene, C$_1$-C$_9$ alkylidene, C$_5$ to C$_9$ cycloalkylidene, C$_5$ to C$_9$ cycloalkylene, or a chemical bond; R$_1$ and R$_2$ are independently H, a C$_1$ to C$_8$ alkyl, a C$_6$ to C$_{20}$ aryl and a C$_5$ to C$_9$ cycloalkyl; the R$_1$'s or R$_2$'s may also form a ring; R$_3$, R$_4$, and R$_5$ are independently R$_1$ or R$_2$ and may also be halogen atoms. Dihydrobenzocyclobutenes (Ar=(17)) are preferred.

The arylcyclobutene monomers useful in this invention can be prepared by several synthesis schemes. The preferred methods of preparation of such monomers are described hereinafter.

In one synthesis scheme an alkyl-substituted aromatic compound which is further substituted with an alkoxycarbonyl group is chloroalkylated in a position ortho to the alkyl group. In the preferred embodiment wherein the aromatic compound is benzene, the starting material corresponds to formula (20), R$_6$ is, for example, methyl or ethyl;

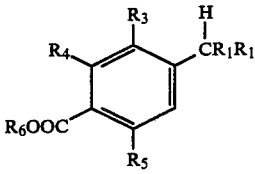

(20)

in the most preferred embodiment R$_3$, R$_4$, and R$_5$ are hydrogen atoms. Chloroalkylation of (20) where (R$_3$=R$_4$=R$_5$=H) yields (21) where R$_1$ and R$_2$ are as previously defined.

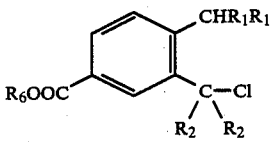

(21)

In this process the chloroalkylating agent is preferably chloromethyl methyl ether, although other chloroalkylating agents such as bis(chloromethyl) ether could be used. At least a 2:1 molar excess of the chloroalkylating agent to the alkyl-substituted aromatic compound is needed. It is preferable to use at least about a 3:1 ratio of chloroalkylating agent to alkyl aromatic compound. The catalyst is ferric chloride (FeCl$_3$) while the cocatalyst is thionyl chloride. The catalyst can be present in between about 0.05 to 1.0 mole per mole of alkyl aromatic. More preferably, between about 0.1 and 0.4 mole of catalyst are present for each mole of alkyl aromatic compound. Preferably, between about 0.05 and 1.0 mole of thionyl chloride per mole of alkyl aromatic is used, more preferably between about 0.1 and 0.4 mole per mole of alkyl aromatic.

This process can be performed at a temperature of between about 40° C. and 80° C., preferably about 40° C. and 60° C. Below about 40° C., the reaction rate is low. The boiling point of some of the components of the reaction mixture starts at about 60° C.

This process can be performed by contacting the alkyl aromatic compound with the chloroalkylating agent, catalyst and cocatalyst in a suitable solvent. Suitable solvents include chlorinated hydrocarbon solvents. Thereafter the reaction mixture is heated to the appropriate temperature. The product can be recovered by quenching the reaction mixture with alcohols or water to inactivate the chloroalkylating agents remaining, stripping off the volatiles and washing out the catalyst with water. The product thereafter is recovered by distillation.

The ortho chloroalkylated alkyl aromatic compounds can be converted to aromatic compounds with cyclobutene rings fused thereto by pyrolysis. This is achieved by contacting the ortho chloroalkylated alkyl aromatic compound with at least 2 times its weight of a suitable diluent, and thereafter passing the mixture through a reactor at a temperature of 550° C. or greater and a pressure of between about atmospheric and 25 mm of mercury. Suitable diluents are generally substituted aromatic compounds which are inert to the chloroalkylated alkyl aromatic compound and are stable at pyrolysis temperatures. Examples of suitable diluents are benzene, toluene, xylenes, chlorobenzenes, nitrobenzenes, methylbenzoates, phenyl acetate or diphenyl acetate. Preferred diluents are the xylenes. Preferred temperatures are between about 700° C. and about 750° C. In a preferred embodiment, the reaction mixture is passed through a hot tube packed with an inert material, for example, quartz chips or stainless steel helices. The product can be recovered by distillation.

When $R_1$ and $R_2$ are H, the product obtained from (21) has the formula (22)

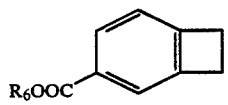

(22)

For simplicity purposes, all further synthesis descriptions will use structure (22). It is understood, however, that these considerations are equally applicable to the preparation of substituted derivatives of (22) as well as derivatives wherein Ar is (18) or (19).

The alkoxycarbonyl moiety of (22) can be converted to a carboxylate moiety by contacting (22) with at least a molar equivalent of alkali metal hydroxide in an alkanol-water solvent system. There after, the carboxylate-substituted material can be converted to an acid chloride (23) by contacting it with thionyl chloride and refluxing at 70° C. to 80° C.

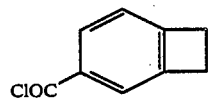

An alternative preparation of (23) is shown in equation [III]:

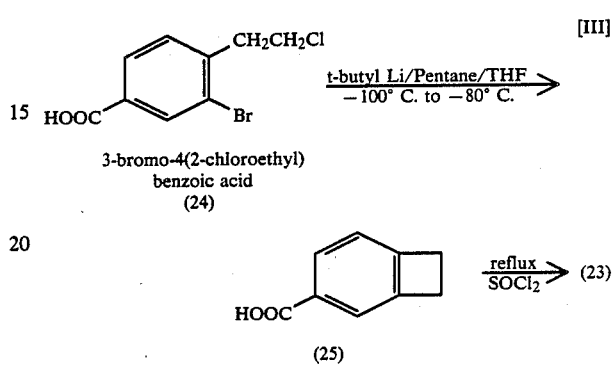

Yet another preparation of (23) is illustrated in equation [IV]:

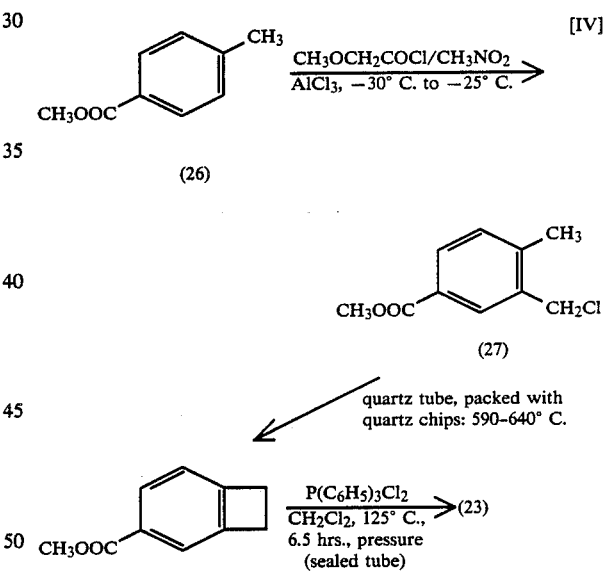

In still another synthetic method, an aryl compound with ortho dibromomethyl groups can be converted to a 1,2-diiodoarylcyclobutene, by contacting the aryl compound substituted with ortho dibromomethyl moieties with an alkali metal iodide in an alkanol solvent at reflux so as to form the diiodoarylcyclobutenes. The product can be recovered by filtering, evaporating the filtrate, and recrystallizing the product. In the embodiment wherein the aryl radical is a benzene radical, and wherein $R_1$, $R_2$, $R_3$, $R_4$ and $R_5$ are hydrogen atoms, the obtained iodobenzocyclobutene corresponds to the formula (29).

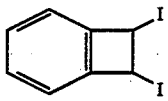
(29)

The 1,2-diiodoarylcyclobutenes, for example (29), can be converted to arylcyclobutenes by dissolving the 1,2-diiodoarylcyclobutenes in an alcohol solvent, preferably methanol or ethanol and contacting the solution with an alkali metal hydroxide in the presence of a palladium-on-carbon catalyst and $H_2$ gas at a temperature of 20° C. to 30° C. In general, at least between about 2 and 4 moles of alkali metal hydroxide per mole of 1,2-diiodoarylcyclobutene is used. Preferably, between about 50 and 200 psi of hydrogen gas is used. The arylcyclobutenes prepared in this manner can be recovered by distillation. Using the above method, compound (29) leads to material (30).

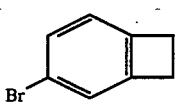
(30)

The arylcyclobutene, for example (30), can thereafter be brominated. In this process, the arylcyclobutene is dissolved in acetic acid and contacted with a brominating agent of pyridinium perbromide hydrobromide in the presence of mercuric salts, for example, mercuric acetate, at a temperature of between about 20° C. and 50° C. The brominated product can be recovered by extraction and distillation. The bromination of (30) gives the bromo derivative (31)

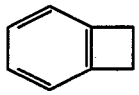
(31)

The brominated arylcyclobutene, such as (31) for example, can thereafter be carbonylated to prepare a hydrocarbyloxy carbonyl-substituted arycyclobutene. This carbonylation is achieved by dissolving the brominated arylcyclobutene in an alkanol solvent, and thereafter contacting the solution with carbon monoxide under pressure in the presence of a palladium catalyst, wherein the palladium is in the zero valence state, in the further presence of an acid acceptor under conditions such that the brominated arylcyclobutene compound undergoes carbonylation. Preferred catalysts are complexes prepared from palladium acetate and triphenyl phosphine, palladium triphenyl phosphine tetrakis, and bis(triphenyl phosphine) palladium chloride complex. The acid acceptor is generally a tertiary amine. In general, the reaction vessel is pressurized with carbon monoxide to a pressure of between atmospheric and 3000 psi. Preferred pressures are between 600 and 1000 psi.

This process is preferably performed at a temperature of between 100° C. and 140° C., most preferably between 120° C. and 130° C. The hydrocarbyloxy carbonyl arylcyclobutene can be recovered by filtering off the catalyst, washing away the acid scavenger with a 10 percent strong mineral acid solution, stripping off the solvent and distilling. The reaction is illustrated in equation [V] where $R_6$ is as previously defined.

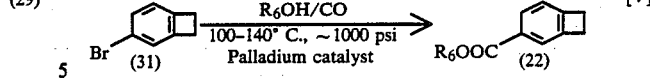
[V]

To prepare an amino substituted arylcyclobutene, a nitration of, for example (30), is performed using a cold solution of sodium nitrate to which is added concentrated sulfuric acid. The nitro compound is dissolved after isolation in ethanol and reduced by hydrogenation over a palladium-on-carbon catalyst (equation [VI]).

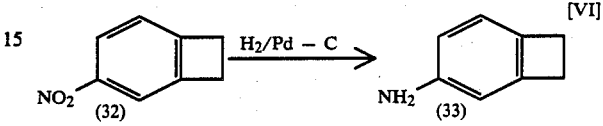
[VI]

To prepare a hydroxy-substituted arylcyclobutene, an amine-substituted arylcyclobutene is contacted with an alkali metal nitrite in the presence of sulfuric acid at 0° C., and thereafter the reaction mixture is heated to about 100° C. To prepare a chlorocarbonyloxy-substituted aryl cyclobutene, the hydroxy-substituted aryl cyclobutene is reacted with phosgene, preferably in the presence of a tertiary amine acid acceptor.

To prepare a mercapto-substituted arylcyclobutene, first an arylcyclobutene is reacted with chlorosulfonic acid to prepare an arylcyclobutene sulfonyl chloride. Arylcyclobutenyl sulfonyl chloride is reacted with zinc to prepare a mercapto-substituted arylcyclobutene. Alternatively, the arylcyclobutene is treated with a mixture of sulfur trioxide and dioxane at 0° C. followed by treatment with water. The arylcyclobutene-sulfonic acid is isolated and treated with phosphorous pentachloride to form the arylcyclobutene sulfonyl chloride which is then reduced with zinc to the mercapto-substituted arylcyclobutene.

To prepare the isocyanato-substituted arylcyclobutene, an amino-arylcyclobutene is reacted with phosgene using techniques that are well-known to those skilled in the art.

Other methods such as those described by Skorcz and Kaminsky, Org. Synth., 48, pages 53–56 (1968) and Matsura et al., Bull. Chem. Soc. Japan 39, p. 1342 (1966) may also be used to prepare the subject arylcyclobutene derivatives.

Aliphatic, aromatic and aliphatic-aromatic polyamides can be for the purposes of the instant invention. These materials have been described in J. Zimmerman, Encyclopedia of Polymer Science and Engineering, 2nd Edition, Vol. 11, pp. 315–381, John Wiley and Sons, Inc., New York, N.Y., 1988. The useful polyamides are of the formulae (34) or (35):

—CO—R$_7$CONHR$_8$NH—     (34)

—CO—R$_9$—NH—     (35)

where $R_7$ and $R_8$ are: diaryl moieties with a bridging group bonding the diaryl moieties, $C_1$ to $C_{20}$ straight chain or branched alkylene, $C_4$ to $C_{12}$ cycloalkylene, $C_6$ to $C_{20}$ arylene, $C_7$ to $C_{25}$ arylalkylene, $C_6$ to $C_{20}$ arylene substituted by groups consisting of $C_1$ to $C_4$ alkoxy and halogen, $C_4$ to $C_{20}$ heterocyclic groups or $C_4$ to $C_{20}$ heterocyclic groups substituted by groups consisting of $C_1$ to $C_4$ alkyl, $C_1$ to $C_4$ alkoxy, and halogen; and where $R_9$ is alkylene, cycloalkylene or arylalkylene as in $R_7$ and $R_8$; with the proviso that only one of said $R_7$ or $R_8$ may be an arylene or heteroarylene.

Thus, the polyamides may be all-aliphatic polymers formed by the polycondensation of dicarboxylic acids with diamines. Suitable dicarboxylic acids include one or more of adipic, pimelic, suberic, azelaic, sebacic, undecanedioic, and dodecanedioic. Suitable diamines include one or more of hexamethylenediamine, haptamethylenediamine, octamethylenediamine, undecamethylenediamine, and dodecamethylenediamine. Adipic acid and hexamethylenediamine are the preferred starting materials.

Another class of useful polyamides is derived from the ring-opening polymerization of lactams. Typical lactams are of formulae (36) or (37)

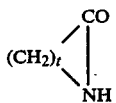
(36)

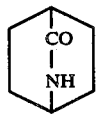
(37)

where t is an integer of 3 to 12. Caprolactam (t=5) is the preferred lactam.

Typical aliphatic-aromatic polyamides are those where $R_7$ or $R_8$ is one or more of the following

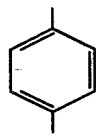
(38)

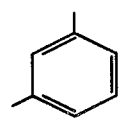
(39)

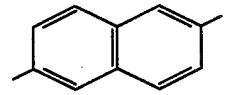
(40)

or isomers thereof and

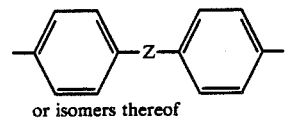
(41)

or isomers thereof and where Z is as previously defined. Materials based on terephthalic acid, optionally admixed with isophthalic and/or adipic acids, and 1,6-hexamethylenediamine are preferred. Another preferred polyamide is based on terephthalic acid and 2,2,4-trimethyl-1,6-hexamethylenediamine.

Polyamides containing heteroarylene groups are, for example, those wherein $R_7$ or $R_8$ are one or more of

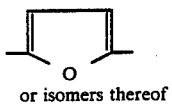
(42)

or isomers thereof

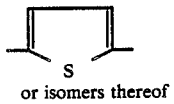
(43)

or isomers thereof and

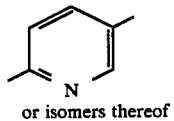
(44)

or isomers thereof

Other polyamides of interest are based on diamines selected from the group of (a) isomeric diamines of the formula

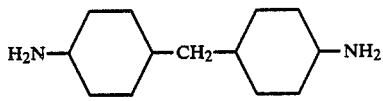
(45)

or (b) isomeric diamines of the formula

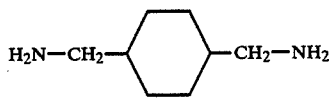
(46)

or (c) diamines having a nitrogen atom as part of a ring, i.e.

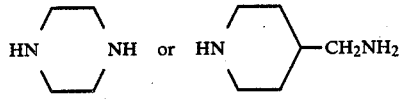

(47)    (48)

and one or more of $C_6$ to $C_{12}$ aliphatic diacids, terephthalic and isophthalic acids.

Polyamides can be prepared using solid-state, melt or solution techniques; the methods are well-known in the art. Typical examples are provided by U.S. Pat. Nos. 3,086,962; 3,232,909; 3,498,956; 3,637,608; and 4,131,712, and by British Patent No. 919,096. An excellent review can be found in the article of J. Zimmerman cited above.

The polyamides should preferably have a reduced viscosity of about 0.3 to about 1.4 dl/g as measured in m-cresol at 25° C. (0.5 g/100 ml); or of about 0.4 to about 1.9 dl/g as measured in .phenol/tetrachloroethane (6:4 by wt.), at 25° C. (0.5 g/100 ml). However, lower and higher reduced viscosities are also useful.

The termination of the polyamides may be performed by adding the end-capping agent bearing the double bond to the polymerization mixture; or, the polyamide may be prepared first and then reacted in a separate step with the terminating agent. Termination may be performed in the melt or in solution.

Typical end-capping reactions include contacting an unsaturated anhydride, acid, acid chloride, isocyanate, chlorocarbonyloxy compound or epoxide with a polyamide bearing at least one free amino group; contacting an unsaturated acid chloride, amine, isocyanate, chlorocarbonyloxy compound, alcohol or mercaptan with a polyamide having at least one carboxyl end-group; or an unsaturated acid, amine, alcohol or mercaptan with a polyamide possessing at least one acid chloride end-group.

The terminated polyamides may be monofunctional (one unsaturated end per chain), or difunctional (both chain ends bearing groups containing carbon to carbon double bonds). Mono- and difunctionality are achieved in a manner that is the same as the one used with polyarylates discussed supra. Thus, monoamino and monocarboxy termination of the polyamide generally leads to the formation of one reactive end-group. Diamino- or dicarboxy-polyamides yield difunctional segments. These latter polyamides are obtained by using a slight excess of the diacid or the diamine during their preparation; or by first preparing the polymers and then reacting them with a slight amount of the corresponding diacid or diamine. The effect of mono- and difunctionality on the block polymer architecture was discussed previously.

Terminators that are useful for the purposes of the instant invention are:

(a) unsaturated anhydrides, such as maleic anhydride, tetrahydrophthalic anhydride and anhydrides of the formulae (49) and (50)

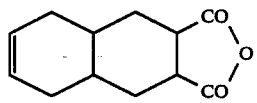
(49)

or isomers thereof

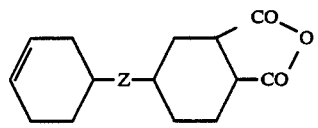
(50)

or isomers thereof where Z is as previously defined:

(b) unsaturated acids, such as acrylic acid, crotonic acid, methacrylic acid and acids of the formulae

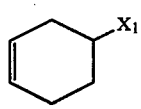
(51)

or isomers thereof

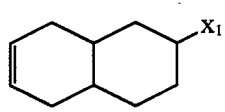
(52)

or isomers thereof and

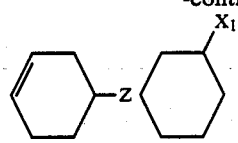
(53)

or isomers thereof where $X_1$ is —COOH and Z is as previously defined;

(c) the chlorides corresponding to the acids of group (b);

(d) unsaturated isocyanates, such as allyl isocyanate, crotyl isocyanate, and isocyanates of the formulae (51), (52) or (53) where $X_1$ is —NCO and Z is as previously defined;

(e) unsaturated chlorocarbonyloxy compounds, such as allyl chloroformate, crotyl chloroformate, and chloroformates of the formulae (51), (52) or (53) where $X_1$ is —OCOCl and Z is as previously defined;

(f) unsaturated epoxides, such as allyl glycidyl ether and glycidyl ethers of the formulae (51), (52) or (53) where $X_1$ is —OCH$_2$

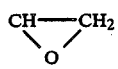

and Z is as previously defined; (g) unsaturated amines, such as allylamines crotylamines, and amines of the formulae (51), (52), or (53) where $X_1$ is —NH$_2$ and Z is as previously defined;

(h) unsaturated alcohols, such as allyl alcohol, crotyl alcohol and alcohols of the formulae (51), (52) or (53) where $X_1$ is —OH and Z is as previously defined; and (i) unsaturated mercaptans, such as allyl mercaptan, crotyl mercaptan and mercaptans of the formulae (51), (52), or (53) where $X_1$ is —SH and Z is as previously defined.

Terminators of group (a), i.e., the unsaturated anhydrides, are preferred. Most preferred is maleic anhydride.

The terminated polyamides are of formulae (54) or (55):

PAm—L$_1$—U     U—L$_1$—PAm—L$_1$—U
(54)                (55)

In the formulae above PAm is the polyamide, U is the end-group comprising a carbon-carbon double bond as defined above and L$_1$ is selected from the group of

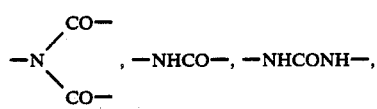

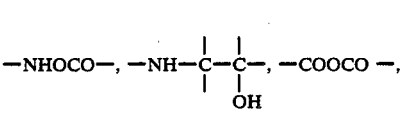

—CONH—, —COO— and —COS—

Polyamides (54) and (55) where L$_1$ is

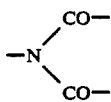

are preferred. These imide end-capped materials are prepared by reacting a mono- or a diamino-terminated polyamide with the unsaturated anhydride in the melt, at temperatures generally in the range of about 25° to about 50° C. above the melting point of the polymer.

The preferred method of preparing the polyarylate-polyamide block copolymers is to mix in the melt the end-capped polyarylate and the end-capped polyamide, at a temperature sufficient to promote the reaction between the 1,2-dihydroarylcyclobutenyl terminus and the carbon-carbon double bond. The preferred temperature range is between about 240° and about 350° C. In addition to the two reactive polymer compounds, an inert processing solvent may be used to further promote phase contact between the two polymers. After the block polymer has been formed, the processing solvent can be removed by such techniques as vacuum devolatilization. Typical processing solvents are N-methyl caprolactam, N-cyclohexylpyrrolidone, diphenyl ether and diphenyl sulfone. N-methyl caprolactam and N-cyclohexylpyrrolidone are preferred. The amount of the processing solvent is generally in the range of up to 25 percent by weight based on the total weight of the polyarylate and polyamide used. Amounts of from about 5 to about 15 percent by weight are preferred.

The polyamide-polyarylate block polymers of this invention can be prepared by methods that do not involve the cycloaddition of a polyarylate bearing a benzocyclobutenyl group to a polyamide having an unsaturated end-group. Thus, the subject block polymers may be prepared via the methods outlined below. These methods can be grouped into two categories, namely those where one preformed block is polycondensed with the ingredients of the second block, and those where two preformed blocks are coupled to give the block copolymer.

A. Reaction of a preformed block with the ingredients of the second block.

A typical reaction is shown in equation (VII):

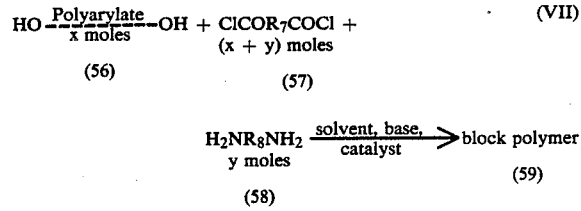

In the equation above a preformed polyarylate segment having hydroxyl termination is polycondensed with an acid chloride and a diamine to yield the copolymer. Obviously, the acid chloride must be used in amounts sufficient to react with the dihydroxy-polyarylate and the diamine. The groups $R_7$ and $R_8$ are as previously defined.

There are several variations and permutations of the method outlined herein. Thus, a diacid chloride terminated polyarylate may be used. Or one may want to employ a preformed polyamide block and condense it with the polyarylate ingredients, etc.

B. Coupling of two preformed blocks.

In this scheme the two blocks are formed first and then polycondensed to give the desired product. There are two possible variations:

B.1. The blocks have mutually reactive groups; or
B.2. The blocks have end-groups that are not capable of reaction with each other and a coupling agent must be used.

B.1. Blocks have mutually reactive groups.

This type of situation is typified when the polyarylate has, for example, a hydroxyl and an acid chloride end-group and the polyamide is terminated by an amino and an acid chloride group. Or, when the polyarylate has two hydroxy groups, while the polyamide is terminated with two acid chloride functions. Other combinations of mutually reactive groups are of course possible.

B.2. Blocks have groups that are not mutually reactive and a coupling agent must be used.

A situation of this type may arise if one wants to prepare a block polymer from a dihydroxy-terminated polyarylate and a diamino-terminated polyamide. The amino and hydroxy groups do not react with each other and, hence, a coupling agent is needed. In this particular case, a diacid chloride (e.g. isophthaloyl or terephthaloyl chloride) or a diisocyanate (e.g. methylene diphenylene diisocyanate, TDI, hexamethylene diisocyanate) may be used to attach the blocks to each other. The reaction is shown schematically in the equation:

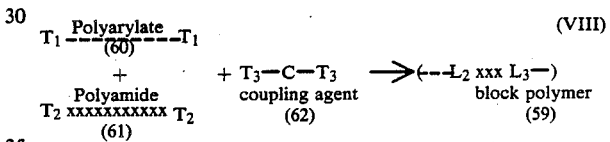

There is a variety of possible $T_1$ and $T_2$ also, the coupling agent may utilize many $T_3$ functions. The reaction of $T_3$ with $T_1$ yields the linking group $L_2$; group $L_3$ is obtained via reaction of $T_3$ with $T_2$. Some typical $T_1$, $T_2$, $T_3$, $L_2$ and $L_3$ are listed in the table.

TABLE

| Typical Coupling Agents and Linking Groups | | | | |
|---|---|---|---|---|
| T1 | T2 | T3 | L2 | L3 |
| OH | NH$_2$ | —COCl | ester | amide |
| OH | NH$_2$ | —NCO | urethane | urea |
| OH | NH$_2$ | —OCOCl | carbonate | urethane |
| OH | NH$_2$ | —OCOO— | carbonate | urethane |
| COCl | COCl | —NH$_2$ | amide | amide |
| COCl | COCl | —OH | ester | ester |
| COCl | COCl | —SH | thioester | thioester |
| COOH | COOH | —OCOCl | ester | ester |
| COOH | COOH | —NCO | amide | amide |

The polyarylate and polyamide blocks required for the preparation of the copolymers can be made via the methods that are useful for producing the corresponding homopolymers. The segments may be mono- or difunctional; methods whereby appropriate termination can be imparted were discussed previously. It is important to note that the architecture of the block copolymers will depend upon the functionality of blocks--vide supra.

The reactions discussed here, in approaches A and B, can be performed in solution or in bulk. In principle, all the methods that are useful for the preparation of polyarylates may be employed. It is preferred to operate in solution, at low temperature. The use of bulk processes is less interesting. Bulk reactions generally require elevated temperatures; they must be performed at temperatures above the melting points of the polyamides (generally at 250°-280° C.; or even higher); at these high temperatures polyamide-polyester interchange takes place, the integrity of the blocks is compromised, and ill-defined copolymers are obtained.

Solution processes can be performed using a single solvent system or a two-phase system, i.e. the interfacial route. The most severe limitation of the solvent route is the general lack of solubility of polyamides. Useful solvents are, therefore, the aprotic polar solvents often used in conjunction with added inorganic salts, such as lithium chloride or calcium chloride. Typical useful solvents are N-methylpyrrolidone, N,N,N',N'-tetramethylurea, N,N-dimethylacetamide, N-butylcaprolactam and hexamethylphosphoramide. The reactions often require an added acid acceptor. These solution processes are described in, for example, U.S. Pat. Nos. 3,063,966 and 3,671,545; in Morgan, Polymer Reprints, Vol. 17, No. 1, p. 47 (1976); in Kwolek et al., ibid., p. 53, and in Fedorov et al., Vysokomolekulyarnye Soedin., Sev. B, 12, 3 (1970), pp. 205-8. Preferably, the solution polymerizations are accomplished by preparing the solutions of the coreactants, cooling these solutions, and then mixing them. Polymer precipitation frequently occurs within a few minutes; on other occasions the reaction mixture may gel. The polymerizations may be stopped by agitating the reaction mixture with a polymer non-solvent, e.g., water, in a suitable blender. The block copolymer is then collected, washed and dried.

In cases where the interfacial polymerization is to be used, it should be performed in the manner described for polyarylates (vide supra). Due to the limited solubility of the polyamides it is best to first prepare the polyarylate segment and condense it, using method A, with the polyamide ingredients. This is, in fact, the most preferred approach to making the subject polyarylate-polyamide block copolymers.

If a high-temperature bulk process must be used, it is generally recommended to use polyamide segments that do not have free amino-termination. Amino termination will lead to aminolysis of the polyarylate and, therefore, to ill-defined copolymers. Thus, one should use either a dicarboxy-terminated polyamide or a polyamide wherein the Amino-group is protected. Examples are shown in equation (IX) and (X).

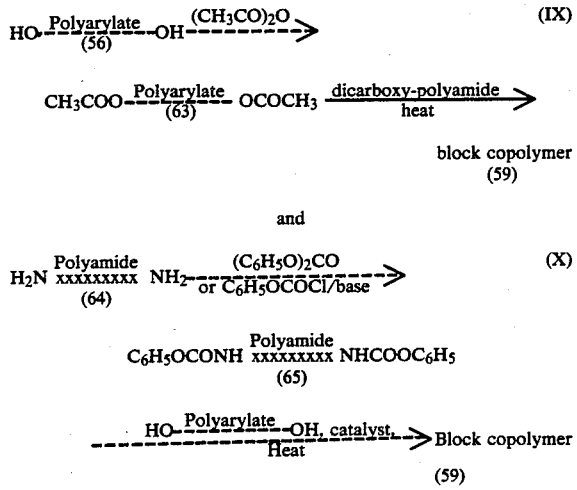

Note, however, that the polyamide-polyarylate interchange leading to block scrambling, will take place even when no amino-terminated polyamides are used.

As indicated before, the block polymers of the instant invention display excellent mechanical properties, improved UV, solvent, and stress-crack resistance; they possess good heat resistance and are easy to melt-fabricate. Quite unexpectedly, the thermoplastic block polymers of this invention give compatible blends with the corresponding homopolymers. Also unexpected was the discovery that the block polymers improve the properties, i.e., act as compatibilizing agents, for polyamide-polyarylate blends. Such blends display significantly improved mechanical properties when combined with block polymer levels of 15 weight percent and higher, based on the total polyarylate and polyamide weight.

The block polymers of the present invention exhibit a reduced viscosity of from about 0.6 to about 3.00 dl/g, preferably from about 1.0 to about 2.5 dl/g, as measured in m-cresol, at 25° C., at a concentration of 0.5 g/100 ml.

The block polymers of the instant invention may include mineral fillers such as carbonates including chalk, calcite and dolomite; silicates including mica, talc, wollastonite; silicon dioxide, glass spheres, glass powders, aluminum, clay, quartz, and the like. Also, reinforcing fibers such as fiberglass, carbon fibers, and the like may be used. The polymers may also include additives such as titanium dioxide, thermal stabilizers, and the like.

The materials of this invention may be fabricated into any desired shape, i.e., moldings, coatings, films, or fibers. They are useful in blends with a variety of other polymers.

EXAMPLES

The following examples serve to give specific illustrations of the practice of this invention but they are not intended in any way to limit the scope of this invention.

Preparation A

The following demonstrates the preparation of 1,2-dihydro-4-chlorobenzoylcyclobutene using the sequence outlined in equation [III].

3-Bromo-4-(2-chloroethyl) benzoic acid (26.3 grams), available from Lancaster Synthesis, was dissolved in tetrahydrofuran (200 milliliters) previously distilled from sodium. The solution was cooled to −100° C. with the aid of a liquid nitrogen bath and 75 ml of tertiary butyl lithium (2.7 molar; in pentane; Aldrich Chemical Co.) was added via syringe under nitrogen over a 10 minute period. The reaction mixture was held at −80° C. for 30 minutes and then allowed to warm to 25° C. over a 2.5 hour time period. The reaction was quenched with 5 milliliters of 5 percent aqueous hydrochloric acid. The tetrahydrofuran solution was diluted with 350 milliliters of n-pentane (previously stirred over sulfuric acid). A white precipitate which formed was filtered, washed thoroughly with water and recrystallized from a water/ethanol (80/20) mixture. A white, crystalline solid (13.6 g, 92.1% yield) with a melting point of 87°-88.5° C. was recovered. Spectral analysis ($^{13}C$ NMR, $^1H$ NMR and IR) confirmed the structure as the carboxylic acid of 1,2-dihydrobenzocyclobutene.

The carboxylic acid derivative was converted to the corresponding acid chloride by refluxing with 1.4 equivalents of thionyl chloride. Once all of the acid had been converted to acid chloride (as monitored by liquid chromatography) the excess thionyl chloride was removed by vacuum distillation leaving a waxy solid. Recrystallization from petroleum ether yielded white platelets having a melting point of 42°–43.5° C. Elemental analysis confirmed the 1,2-dihydro-4-chlorobenzoylcyclobutene composition.

| Elemental Analysis | | | |
|---|---|---|---|
| | % C | % H | % Cl |
| Calculated | 64.88 | 4.24 | 21.28 |
| Found | 64.87 | 4.22 | 21.31 |

Preparation B

The following demonstrates the preparation of a polyarylate end-capped with the 1,2-dihydrobenzocyclobutenyl group.

A 500-millimeter three-neck round bottom flask was equipped with a mechanical stirrer, nitrogen inlet/outlet, a thermometer and a pressure equalizing addition funnel. The flask was charged with:

7.8 grams of isophthaloyl dichloride;
7.8 grams of terephthaloyl dichloride and
0.6 grams of 1,2-dihydro-4-chlorobenzoylcyclobutene.

The acid chloride monomers were dissolved in freshly distilled dichloromethane (80 milliliters). The pressure equalizing addition funnel was charged with an aqueous solution from 12.4 grams of sodium
17.78 grams of 4,4'-isopropylidene diphenol and
120 grams of deionized water.

The contents of the flask were cooled to 15° C. with an ice bath and 0.006 grams of benzyl triethylammonium chloride were added to the dichloromethane solution. The agitator was set up to 300 rpm and the aqueous solution of the diphenolate was added at a rate so as to maintain the reaction temperature between 18°–20° C.

The aqueous solution was separated from the dichloromethane layer. The organic layer was washed with 5 percent acetic acid (aqueous), water, 5 percent bicarbonate (aqueous), and water. The transparent organic layer was poured into a 5-fold excess of isopropanol with agitation to coagulate the polymer.

The polyarylate exhibited a glass transition temperature (Tg) as measured by differential scanning calorimetry of 189° C. The reduced viscosity (RV) measured as a 0.5 weight percent chloroform solution at 25° C. was 0.68. The number average molecular weight (Mn) and weight average molecular weight (Mw) as measured by gel permeation chromatography versus mono-disperse polystyrene standards were 24,600 and 48,700, respectively.

Quantification of the 1,2-dihydrobenzocyclobutenyl end-groups was achieved by first reacting the polyarylate (5 grams) with maleic anhydride (5 grams) in 70 milliliters of diphenyl ether at reflux for one hour. The maleic anhydride undergoes a Diels-Alder reaction with the end group on the polyarylate, thereby becoming chemically bound to the polyarylate terminus yielding a functionality which was readily titratable. The anhydride content was titrated potentiometrically in accordance with the procedure given in Polym. Bull., 16, p. 441 (1986). The RV before and after the maleic anhydride reaction remained within 0.01 dl/g of one another. In addition, a control was established to ensure accurate end-group evaluation by refluxing the polyarylate in the absence of maleic anhydride.

In order to establish uniform end-capping reactivity the polyarylate (10 grams) was dissolved in 1,3,5,-triisopropylbenzene along with 2 grams of 1,1'-(methylene-4,1-diphenylene) bismaleimide and heated to reflux for 2 hours. The degree of chain extension as determined by RV and GPC measurements indicates the uniformity of end-capping. After reaction with the bismaleimide the RV equaled 1.42, the Mn equaled 49,100 and the Mw equaled 87,500. Thus, the polyarylate appears to be uniformly end-capped with the 1,2-dihydrobenzocyclobutenyl grouping.

Preparation C

The following preparation serves to demonstrate the end-capping of various polyamides with maleic anhydride.

The polyamide was charged to a Brabender mixing apparatus at a temperature 30° C. above the $T_m$ (melting temperature). On a weight basis, 3.5% maleic anhydride was added and the molten polymer was mixed at temperature for five minutes at 63 rpm. The presence of the maleimide functionality was determined by infrared analysis (Table I).

TABLE I

| | Polyamide | $RV^1$ Before MA Addition | RV After MA Addition | Infrared Analysis |
|---|---|---|---|---|
| 1 | Nylon 6, (Capron 8207) Allied Chem.) | 1.01 | 1.02 | 1695 cm$^{-1}$ (imide C=O) |
| 2 | Nylon 6,6; (DuPont) Zytel 42 | 1.21 | 1.23 | 1695 cm$^{-1}$ (imide C=O) |
| 3 | T/I/AA// HMDA$^2$ | 1.41 | 1.45 | 1695 cm$^{-1}$ (imide C=O) |

[1]RV (0.5 wt %, m-cresol, 25° C.)
[2]T = terephthalic acid, I = isophthalic acid, AA = adipic acid, HMDA = hexamethylenediamine T/I/AA//HMDA (50/20/30//100)

Thermal analysis of the polyamides shows no change after the maleimidization process (Table II).

TABLE II

| | $T_m$ (°C.)* | | $\Delta H_f$ (cal/g) | |
|---|---|---|---|---|
| Polyamide | Before | After | Before | After |
| Nylon 6 | 226.5 | 226 | 15.0 | 14.9 |
| Nylon 6,6 | 261.2 | 261.7 | 9.5 | 9.6 |
| T/I/AA//HMDA$^2$ | 289.7 | 290.1 | 7.4 | 7.5 |

*The Tm was measured via DSC or by using a Hoover melting point apparatus.
[2]T = terephthalic acid, I = isophthalic aicd, AA = adipic acid, HMDA = hexamethylene diamine T/I/A//HMDA (50/20/30//100)

EXAMPLE I

This example serves to demonstrate the polyarylatepolyamide block copolymer formation.

The polyarylate (prep. B) was combined with the polyamides (prep. C 1-3) in a Brabender mixing apparatus for 5 minutes at 100 rpm (Table III). Block copolymer formation was evaluated by RV measurement (chain extension) and selective component extraction (formic acid for polyamide; methylene chloride for polyarylate). The data in Table III confirm block polymer formation as control solvent blended (i.e., no thermal history) polyarylate-polyamide systems allow near quantitative extraction of individual components.

TABLE III

|  | % wt | % wt | % wt |
|---|---|---|---|
| Polyarylate (prep. B) | 50 | 50 | 50 |
| Polyamide (prep. C-1) | 50 | — | — |
| Polyamide (prep. C-2) | — | 50 | — |
| Polyamide (prep. C-3) | — | — | 50 |
| N-methyl caprolactam, phr | 13 | 14 | 12 |
| Reaction temperature (°C.) | 260 | 275 | 285 |
| RV (dl/g, m-cresol)[1] | 1.82 | 1.97 | 2.21 |
| % Block Copolymer Soluble in[2] | | | |
| Formic Acid | 0.9 | 1.5 | — |
| Methylene Chloride | 0.7 | 1.1 | 0.6 |
| Tm (°C.)[3] | 220 | 257 | 284 |
| ΔH$_f$ (cal/g) | 6.9 | 4.1 | 3.3 |

[1]Polyarylate (prep. B), RV in m-cresol = 0.61 dl/g.
[2]N-methyl caprolactam removed prior to formic acid and methylene chloride extractions.
[3]By DSC or Hoover melting point apparatus.

EXAMPLE 2

This serves to demonstrate the utility of the polyarylate-polyamide block copolymers of Example I as compatibilizing agents for polyarylate/polyamide blends.

In a Brabender mixing apparatus at 265° C., 60% by weight of Ardel D-100 polyarylate resin (Amoco Performance Products, (Inc.) and 40% Capron 8200 Nylon 6 resin (Allied Chemical Company) were combined and mixed for 5 minutes at 100 rpm. The same control composition was prepared in an analogous fashion with 5, 10, and 20 phr of the polyarylate-polyamide block copolymer prepared in Example 1.

Physical property measurements were made on $\frac{1}{8}$" strips shearcut from a molded 4"×4"×0.020" sheet after being compression molded at 270° C. Notched Izod measurements were made on compression molded bars (Table IV).

TABLE IV

|  | Parts by Wt. | | | |
|---|---|---|---|---|
| Ardel D-100 | 60 | 60 | 60 | 60 |
| Capron 8200 | 40 | 40 | 40 | 40 |
| Block polymer (Ex. 1), phr | — | 5 | 10 | 20 |
| Tg (via resilience method) | 185 | 184 | 185 | 186 |
| Tensile Mod. (psi) ASTM D-638 | 222,000 | 225,000 | 231,000 | 234,000 |
| Tensile Str (psi) ASTM D-638 | 7,120 | 7,420 | 10,100 | 10,400 |
| Elongation at Break (%) ASTM D-638 | 20 | 29 | 53 | 59 |
| Pendulum Impact (ft-lb/in$^3$) | 62 | 97 | 170 | 181 |
| Notched Izod (ft-lbs/in) ASTM D-256 | 1.3 | — | 3.6 | — |
| % Soluble in Formic Acid | 39.1 | 36.2 | 30.1 | 30.6 |
| % Soluble in CH$_2$Cl$_2$ of Formic Acid Insoluble | 92.2 | 86.3 | 81.7 | 82.1 |

A definite improvement in the % elongation and in the pendulum impact values is observed when the blend contains the subject block copolymer.

We claim:

1. A composition comprising a well-defined thermoplastic block copolymer (B)$_{U-1}$(AB)$_n$(A)$_{V-1}$ wherein n is one or greater, U and V are 1 or 2, A is a polyacrylate block and B is a polyamide block wherein said polyarylate block is joined to said polyamide block via a cycloaddition reaction of a terminal block and a terminal ethylenically unsaturated double bond on the polyamide block.

2. The composition of claim 1 wherein said polyarylate blocks comprise units of aromatic dihydroxy moieties and aromatic dicarboxylic acid moieties.

3. The composition of claim 2 wherein said polyarylate blocks comprise
   (a) at least one unit derived from a dihydroxy moiety selected from the group consisting of dihydric phenols represented by the formula:

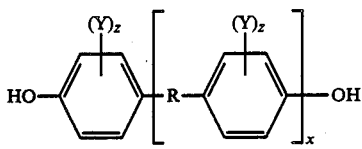

where Y is independently selected from alkyl groups of 1 to 4 carbon atoms, chlorine or bromine; z independently has a value of from 0 to 4 inclusive; and R is independently selected from a divalent C$_6$ to C$_{20}$ aromatic radical, or C$_1$ to C$_9$ saturated aliphatic hydrocarbon radical such as C$_1$ to C$_8$ alkylene or alkylidene radical, cycloalkylene or cycloalkylidene radicals of up to 9 carbon atoms, O, S, SO, SO$_2$, CO and a chemical bond; X is 0 or 1; and the group of naphthalene diols; and
   (b) at least one aromatic dicarboxylic acid selected from at least one member of the group consisting of terephthalic acid isophthalic acid, naphthalene dicarboxylic acids and C$_1$ to C$_4$ alkyl or halo substituted derivatives of these acids.

4. The thermoplastic block copolymer composition of claim 1 wherein said polyarylate comprises the polyester of 2,2-bis(4-hydroxyphenyl)propane and at least one acid selected from the group consisting of terephthalic acid, isophthalic acid, naphthalene dicarboxylic acids and C$_1$ to C$_4$ alkyl or halo substituted derivatives of these acids.

5. The composition of claim 1 wherein said polyamide moiety of said block copolymer is selected from at least one member of the group consisting of aliphatic, aromatic and aliphatic-aromatic polyamides of the following formulas:

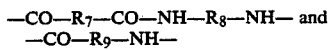

R$_7$ and R$_8$ are: diaryl moieties with a bridging group bonding the diaryl moieties, C$_1$ to C$_{20}$ straight chain or branched alkylene, C$_4$ to C$_{12}$ cycloalkylene, C$_6$ to C$_{20}$ arylene, C$_7$ to C$_{25}$ arylalkylene, C$_6$ to C$_{20}$ arylene substituted by groups consisting of C$_1$ to C$_4$ alkoxy and halogen, C$_4$ to C$_{20}$ heterocyclic groups or C$_4$ to C$_{20}$ heterocyclic groups substituted by groups consisting of C$_1$ to C$_4$ alkyl, C$_1$ to C$_4$ alkoxy and halogen; and where R$_9$ is alkylene, cycloalkylene or arylalkylene as in R$_7$ and R$_8$; with the proviso that only one of said R$_7$ and R$_8$ may be arylene or heteroarylene.

6. The composition of claim 5 wherein said R$_7$ or R$_8$ of the polyamide comprises at least one of the following:

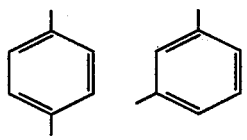

and or isomers thereof

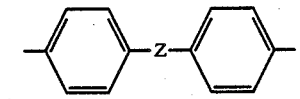

or isomers thereof where Z is selected from the group consisting of O, SO, $SO_2$, CO, S-S, S, $C_1$ to $C_9$ alkylene, $C_1$ to $C_9$ alkylidene, $C_5$ to $C_9$ cycloalkylidene, $C_5$ to $C_9$ cycloalkylene, and a chemical bond.

7. The composition of claim 1 wherein said polyamide is the reaction product of adipic acid and hexamethylene diamine.

8. The composition of claim 1 wherein said polyamide is derived from the reaction of hexamethylene diamine and a dicarboxylic acid wherein at least one member is selected from the group consisting of isophthalic acid, terephthalic acid and adipic acid, 9. The composition of claim 1 wherein said polyamide is the reaction product of hexamethylene diamine and a benzene dicarboxylic acid comprising isophthalic acid, terephthalic acid, and adipic acid.

10. The composition of claim 1 wherein said polyamide is the reaction product of hexamethylene diamine and a benzene dicarboxylic acid selected from the group consisting of isophthalic acid, terephthalic acid, adipic acid and mixtures thereof.

11. The composition of claim 1 wherein said polyarylate moiety of said block copolymer is in the range of from about 1 to about weight 99 percent of said block copolymer.

12. The composition of claim 1 wherein said polyarylate comprises about 30 to about 70 weight percent of said block copolymer.

13. The composition of claim 1 wherein said polyarylate comprises about 40 to about 60 weight percent of said block copolymer.

14. The thermoplastic block copolymer composition of claim 1, wherein said polyarylate comprises the polyester of 2,2-bis(4-hydroxyphenyl)propane and at least one acid selected from the group consisting of terephthalic acid, isophthalic acid, naphthalene dicarboxylic acids and $C_1$ to $C_4$ alkyl or halo substituted derivatives of these acids, and wherein said polyamide moiety of said block copolymer is selected from at least one member of the group consisting of aliphatic and aliphatic-aromatic polyamides of the following formulas:

—CO—$R_7$ CO Nh $R_8$ NH— and —CO—$R_9$—NH— where $R_7$ and $R_8$ are: diaryl moieties with a bridging group bonding the diaryl moieties, $C_1$ to $C_{20}$ straight chain or branched alkylene, $C_4$ to $C_{12}$ cycloalkylene, $C_6$ to $C_{20}$ arylene, $C_7$ to $C_{25}$ arylalkylene, $C_6$ to $C_{20}$ arylene substituted by groups consisting of $C_1$ to $C_4$ alkoxy and halogen, $C_4$ to $C_{20}$ heterocyclic groups or $C_4$ to $C_{20}$ heterocyclic groups substituted by groups consisting of $C_1$ to $C_4$ alkyl, $C_1$ to $C_4$ alkoxy and halogen; and where $R_9$ is alkylene, cycloalkylene or arylalkylene as in $R_7$ and $R_8$; with the proviso that only one of said $R_7$ or $R_8$ may be an arylene or heteroarylene.

15. The thermoplastic block copolymer composition of claim 1, wherein said polyarylate comprises the polyester of 2,2-bis(4-hydroxyphenyl)propane and at least one acid selected from the group consisting of terephthalic acid, isophthalic acid, naphthalene dicarboxylic acids and $C_1$ to $C_4$ alkyl or halo substituted derivatives of these acids, and wherein said polyamide is derived from the reaction of hexamethylene diamine and a dicarboxylic acid comprising isophthalic acid, terephthalic acid and adipic acid.

16. A process for preparing a well defined thermoplastic block copolymer $(B)_{U-1}(AB)_n(A)_{V-1}$ wherein A is a polyarylate block, B is a polyamide block, n is one or greater, and U and V are 1 or 2; comprising the cycloaddition reaction of a polyarylate having at least one terminal dihydroarylcyclobutenyl moiety with a polyamide having at least one terminal ethylenically unsaturated double bond.

* * * * *